United States Patent Office 3,585,218
Patented June 15, 1971

3,585,218
PREPARATION OF DIFLUORAMINES BY OXIDATION WITH 1,1-BIS(FLUOROXY)PERFLUOROALKANE
Richard L. Talbott, White Bear Lake, Minn., assignor to Minnesota Mining and Manufacturing Company, St. Paul, Minn.
No Drawing. Continuation of abandoned application Ser. No. 448,575, Apr. 12, 1965. This application May 24, 1967, Ser. No. 643,798
Int. Cl. C07c 27/00
U.S. Cl. 260—350
3 Claims

ABSTRACT OF THE DISCLOSURE

Fluorinative oxidations are effected using energized fluoroxy compounds such as $(FO)_2CF_2$. The products include selectively fluorinated compounds in which fluorine may replace hydrogen on carbon or nitrogen. Reduction products of the oxidant may include peroxy groups not initially present.

---

This application is a continuation of my application Ser. No. 448,575 filed Apr. 12, 1965, now abandoned.

This invention relates to a process for fluorinative oxidation and particularly to fluorinative oxidations effected by energized fluoroxy compounds and more particularly by poly(fluoroxy)perfluoroalkanes, such as 1,1-bis-(fluoroxy)perfluoroalkanes, and to products obtained thereby.

The reactions of fluoroxy compounds or oxyfluorides are not well understood. A process for the preparation of trifluoromethyl hypfluorite, also known as fluoroxy trifluoromethane or trifluoromethyl oxyfluoride, is described by Cady and Kellogg in U.S. Pat. No. 2,689,254. Cady and various coworkers have investigated this compound and its reactions reporting the results in numerous articles in the Journal of the American Chemical Society, viz, 70, 3986 (1948); 75, 2501 (1953); 79, 5625, 5628 (1957); 81, 1089 (1959); 82, 6005 (1960). It was reported that many reactions were violent or explosive. More recently, monofluoroxy compounds have been described by Prager and Thompson in the Journal of the American Chemical Society, vol. 87, page 230 et seq. (1965).

It is one object of this invention to employ fluoroxy compounds in non-explosive reactions.

A further object of this invention is to effect controlled fluorinations by fluoroxy compounds.

Another object of the invention is to provide novel partial reduction products of fluoroxy compounds.

A yet further object of the invention is to provide a process for the reduction of fluoroxy compounds to novel lower oxidation stages.

Yet other objects of the invention will become apparent from the disclosure herein.

In accordance with the above and other objects of the invention it has been found that controlled fluorinative oxidations of many compounds are possible and give useful products when the compounds react with energized fluoroxy perfluoroalkanes.

By energized fluoroxy compounds are meant those fluoroxy perfluoroalkanes of up to about 18 carbon atoms which are activated by the presence of an activating substituent on the carbon bearing the OF group. Neither fluorine nor perfluoroalkyl bonded through carbon effects activation or energization as here employed. As used herein "energized" does not refer to thermal instability. Some examples of energized fluoroxy compounds are 1,1-bis(fluoroxy)perfluoroalkanes such as bis(fluoroxy)perfluoromethane, which have a second fluoroxy group on the same carbon atom as and activating the first fluoroxy group, and 1-perfluoroalkylperoxy-1-fluoroxyperfluoroalkanes which have a perfluoroalkylperoxy group attached to the same carbon atom as and activating the fluoroxy group. Energized fluoroxy compounds are distinct from simple, i.e. unactivated, monofluoroxy compounds, such as those described herein elsewhere, in that the simple monofluoroxy compounds so described have only fluorine or perfluoroalkyl groups bonded through carbon attached to the carbon atoms bearing the OF group.

Fully equivalent with acyclic perfluoroalkyl radicals in the energized fluoroxy compounds used in the invention are perfluorinated carbocyclic and heterocyclic radicals, for example, perfluoropyridyl, perfluorocyclohexyl, perfluorocyclohexylethyl and the like radicals. Perfluoroalkyl radicals containing other atoms in the chain are also equivalent for the purposes of this invention; for example, peroxy, oxa, aza and the like atoms or groups of atoms can be present.

Likewise, the perfluoroalkyl radicals can be substituted by certain electronegative groups, which may replace one or more fluorine atoms or $CF_3$ groups. They are characterized by being free from hydrogen, non-reducing with respect to the —OF group, and having a Hammett meta sigma parameter equal to or greater than +0.3 (reference is here made to the report of H. H. Jaffe, Chemical Reviews, vol. 53, pp. 191–261, 1953). Such groups include —$NF_2$

—$NO_2$, —$ONF_2$, perchloryl, peroxy and the like groups.

In these reactions, the behavior of bis(fluoroxy(difluoromethane available inter alia by the fluorination of sodium oxalate, is considered exemplary of the reactions of presently less readily available homologous and other energized fluoroxy compounds available by the fluorination of other oxygen containing compounds. It is further a preferred compound because of the relatively low equivalent weight which means that less material by weight need be handled to achieve a particular desired stoichiometric proportion. It is also preferred because it is more readily manipulated, for example, because it has not been observed to crystallize in the range down to —196° C. It is found that many fluorinated oxidants, of which class the bis(fluoroxy)perfluoroalkanes are members, are more susceptible to spontaneous explosion during the phase change from solid to liquid and, consequently, the phase change between solid and liquid is desirably avoided. A further desirable feature in the manipulation of bis(fluoroxy)difluoromethane is its relatively greater volatility (boiling point about —64° C. at atmospheric pressure) making it more easily manipulated as a vapor. This is especially convenient in the handling of materials in relatively small amounts as is desirable in experimenting with very reactive materials.

Although those having skill in the art of fluorinated oxidants will appreciate the very reactive nature of the reactants here employed and that procedures here described in some detail exhibit prudent precautions, those possessing skill in more classical organic chemistry may be misled into assuming either that these procedures are excessively perilous or, on the other hand, are excessively timorous. It must be emphasized that precautions consistent with the reactivities of the compounds must be taken and adhered to to avoid injury to personnel. Thus, although metallic vessels may be used if adequate barricades are employed, there is an advantage to the use of glassware for ordinary procedures in that explosion results in virtual pulverization rather than, as in the case of metal, the release of quantities of shrapnel-like metallic pieces at high velocities. The powdered glass is less hazardous. The use of adequate and suitable ventilation is necessary in all procedures. In the procedures described hereinbelow all precautions are not repeated at each point inasmuch as one should not attempt duplication of these procedures until he has achieved sufficient familiarity with the techniques used in the art to recognize that such procedures are necessary for personal safety.

In general the process of the invention results in the incorporation of from 1 to 4 fluorine atoms in a molecule. Because of the peculiar properties of fluorine compounds, a classical approach to describing the various reactions appears to be impossible. The process may herein be termed a fluorination for simplicity in nomenclature but it is to be borne in mind, and will become more evident hereinafter, that the incorporation of fluorine in many structures, particularly those containing oxygen or nitrogen, is an oxidation reaction as well as a substitution and/ or addition and the process is therefore more fully and accurately described as a fluorinative oxidation.

In certain embodiments the process of the invention results in both fluorinative and oxidative oxidation and the products thus obtained provide a novel series of compounds as will become evident hereinafter.

In another aspect of the invention, at the same time that the poly(fluoroxy)perfluoroalkanes effect selective fluorinative oxidations, they are selectively reduced to provide novel peroxy compounds as will also become apparent.

In considering the process and products of the invention it is necessary to realize that the concept of oxidation should not be limited only to increase of valences from carbon to oxygen, but more generally involves the alteration of at least one bond between a pair of elements to the bond between a second pair of elements; the two pairs having one common member and the member of the second pair not common to the two pairs being more electronegative than the non-common member of the first pair. It will be seen that a special case is that in which the common member undergoes an increase in valence. In this special case, an electron pair is conveniently considered as the non-common member of the pair of elements. The product of an oxidation is thus at a higher oxidation state than the oxidizable reactant and the oxidizing agent is reduced.

This generalized concept of oxidation is very useful in understanding oxidation reactions and the relative oxidation stages of series of compounds such as the intermediate stages between aniline and nitrobenzene, not necessarily in order of progressive oxidation, e.g., azobenzene, azoxybenzene, hydrazobenzene, nitrosobenzene and phenylhydroxyamine, the oxidation stages between methane and carbon dioxide, e.g. methanol, formaldehyde and formic acid, or the numerous incremental stages from phosphine to phosphorus pentoxide including, inter alia, the numerous acids of phosphorus.

The process of the invention emphasizes that oxidation stages exist in which fluorine is the more electronegative non-common member of the second pair as described above and further that the fluoroxy group should be viewed as a group intermediate in electronegativity between oxygen and fluorine and the fluoroxy group may also be the non-common member of the second pair. The fluoroxy group thus effects fluorinative oxidation reactions more selectively than can be achieved using elemental fluorine. In cases in which the spread of electronegativities of the non-common members of the above pair is large, fluoroxy compounds are also capable of effecting the same overall reactions as achieved by elemental fluorine. The process of the invention employing energized fluoroxy compounds is thus particularly useful for effecting selective fluorinations, i.e. replacing particular hydrogen atoms by fluorine.

It will be seen that the energized or activated fluoroxy compounds undergo selective reduction to produce compounds still possessing oxidizing capabilities. The precise products obtained in any specific case will obviously depend in the last analysis on existing structural features and on thermodynamic factors such as oxidation and reduction potentials, activation energies and environmental factors and kinetic factors such as the presence or absence of water, acidity, basicity, container material, etc. It is contemplated that the working examples provided hereinafter will readily enable one skilled in the art to carry out the present invention. It will also be seen that the terms fluorinative oxidation and oxygenative oxidation are conveniently employed in describing the intsant process and that these may occur separately or conjointly.

It is a rather interesting feature of oxidations by the process of the invention that certain of the reduction products are also oxidants having, of course, a lower oxidation potential than the initial energized fluoroxy compound. Thus when perfluoroguanidine, which is itself a very powerful oxidant, is oxidized by 1,1-bis (fluoroxy)difluoromethane in the presence of a catalyst, the valuable oxidant tris(difluoroamino)fluoromethane is obtained in good yield as the primary product of oxidation together with the fluoroformate of perfluoromethyl hydroperoxide:

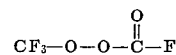

also an oxidant, but formed by reduction from the 1,1-bis(fluoroxy)difluoromethane. Other products of the reaction, besides relatively small fragments, include bis(perfluoromethyl) bis(peroxy)carbonate, bis(difluoramino) difluoromethane and bis(difluoramino)fluoronitromethane. Catalysts are generally substantially non-hydrated salts such as KF, KCN, Na$_2$CO$_3$ or Na$_2$C$_2$O$_4$. When KCN is the catalyst, tris(difluoramino)acetonitrile is a further product.

When other 1,1-bis(fluoroxy)perfluoroalkanes

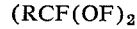

in which a second fluoroxy group energizes a first fluoroxy group are used in the process of the invention, novel reduction products having the structures:

are produced, wherein R is perfluoroalkyl as herein elasewhere broadly defined and contains from 1 to about 18 carbon atoms. When 1-perfluoroalkylperoxy-1-fluoroxy-perfluoroalkanes

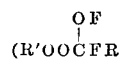

in which a perfluoroalkylperoxy group is the energizing group) are used in the process of the invention, novel reduction products of the general formula

are produced wherein R' is perfluoroalkyl-CF$_2$.

The above fluoroformate is itself susceptible of fluorinative oxidation of the carbonyl group and/or hydrolysis by water to produce the several oxidants shown in the following diagram:

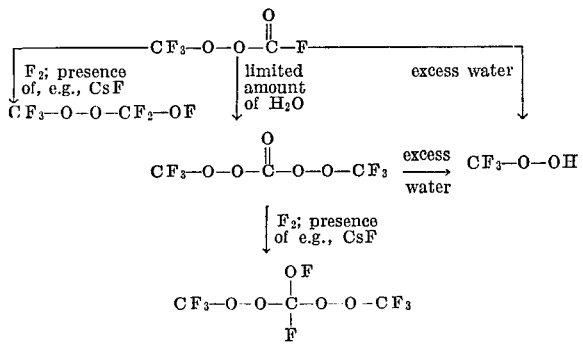

Oxidation of other fluorimines, e.g., compounds containing the grouping

are also brought about by energized fluoroxy compounds in the presence of a catalyst such as anhydrous KF or KCN. Perfluoroformamidine, available from the fluorination of ammeline, is readily oxidized by either 1,1-bis-(fluoroxy)difluoromethane or 1,1-bis(fluoroxy)perfluoroethane in the presence of a catalyst to bis(difluoramino) perfluoromethane and $FN=C(NF_2)-CN$ (from HCN and perfluoroguanidine) is oxidized to bis(difluoroamino) perfluoroacetonitrile in the presence of KF by 1,1-bis(fluoroxy)difluoromethane. Oxidation of other fluorimines, such as N-fluoro-perfluorocyclohexylidinimine, leads to mixtures of oxidants as does also the oxidation of perfluoro-N-alkyl aldimines such as $CF_3CF=N-CF_2CF_3$. The compound $FN=C(NF_2)-OCH_3$ also undergoes fluorinative oxidation in the process of the invention.

It is found that both monofluoroxy and 1,1-bis(fluoroxy)perfluoroalkanes oxidize tetrafluorohydrazine in the process of the invention to nitrogen trifluoride. This illustrates particularly the fluorinative oxidation of a nitrogen-nitrogen bond. However, reaction thereof with 1,1-bis (fluoroxy)perfluoromethane (no catalyst being necessary) gives difluoraminoxyperfluoromethane or perfluoro-methoxylamine, $CF_3ONF_2$, as one product. It is contemplated that higher bis(fluoroxy)perfluoroalkanes will provide the corresponding difluoraminoxyperfluoroalkanes.

In some instances fluorinative oxidation proceeds to give substitution of fluorine for hydrogen attached to carbon particularly at room temperature or lower. Thus benzene gives fluorobenzene, acetonitrile gives monofluoroacetonitrile and methyl trifluoroacetate gives the novel monofluoromethyl trifluoroacetate. Reaction with ethyl esters of perfluorinated carboxylic acids gives predominantly the α-fluoroethyl esters with lesser amounts of β-fluoroethyl esters. The process of the invention is thus quite selective as to the substitution of fluorine for hydrogen.

As examples of reactants comprising oxygen, dimethyl ether is completely degraded and methanol reacts to give methyl fluoroformate. At elevated temperatures (e.g., 150° C.), perfluorocapronitrile is fluorinatively and oxygenatively oxidized to caproyl fluoride and 1-nitroperfluorohexane. Perfluorinated acids, both carboxylic and sulfonic, and anhydrides are relatively unreactive and undergo no oxidation in the process of the invention at room temperatures even during several days. Likewise trifluoromethyl hydroperoxide and compounds in which there are tris(difluoroamino)methoxy or bis(difluoramino)fluoromethoxy groups are not oxidized. Without wishing to be bound by the theory, this can be explained on the hypothesis that these compounds and their respective functional groups are at such high states of fluorinative or oxygenative oxidation that there is insufficient oxidation potential in the bis(fluoroxy)perfluoroalkane to overcome the energy of activation. As examples, neither tris(difluoroamino)methyl, nor bis(difluoroamino)fluoromethyl methyl ether nor O-tris(difluoramino)methyl acetone oxime reacts to a detectible extent with 1,1-bis(fluoroxy)perfluoromethane unless to effect slow decomposition even on standing for almost a half year at room temperature.

The invention is now further described by specific examples showing the practice of the invention. It will be understood that precautionary measures suitable to the reactants are within the skill of the art although set forth in some examples as a guide for those not fully conversant with such measures. In these examples, pressures are indicated in millimeters of mercury although it will be recognized that these systems must not be contaminated by mercury vapors and gauges of suitably non-corrodible metals are therefore employed.

EXAMPLE 1

This example describes an oxidation carried out by the process of the invention with particularity as to convenient equipment and precautions in the manipulation of certain powerful oxidants which those skilled in the art will readily recognize as being necessary for safety although not limiting as to the reaction itself if safety be disregarded.

A clean, dry 10-ml. borosilicate glass reaction vessel equipped with a Fischer and Porter Teflon valve and a Teflon-covered magnetic stirring bar is charged with 454.8 mg. of dry reagent potassium cyanide. The reactor is then charged under reduced pressure at −110° C. with 5.59 mmoles of freshly distilled $CFCl_3$ and 2.48 mmoles of pure perfluoroguanidine (available from the fluorination of ammeline or guanidine salts). The bath at −110° C. is removed, and the reactor contents are stirred thoroughly while the reactor warms to room temperature. When the suspension is thoroughly mixed, the reactor is cooled in a bath of liquid nitrogen. The reactor is charged under reduced pressure with 5.63 mmoles of pure bis(fluoroxy)perfluoromethane. The reactor is sealed with the Fischer and Porter valve and the liquid nitrogen bath is replaced by a bath initially at −110° C. This bath is allowed to warm slowly to room temperature overnight. The mixture is stirred as it warms to room temperature.

It is convenient and prudent to provide explosion shields around such reaction vessels. In the case of small reactors a cloth or fiber glass shatter-bag with drawstrings may be used to enclose the vessel during the warming. With reactors of the size of this example, barricades or shields of plastic or shatterproof glass are provided.

The mixture is then stirred at room temperature for eight hours and is kept thereafter at −78° C. until worked up.

The volatile products in the reaction mixture are distilled from the reaction vessel and transferred to the vacuum line under reduced pressure. There is obtained 12.6 mmoles of volatile material. Analysis of a portion of this sample by fluorine n.m.r. spectroscopy shows that the reaction has gone to completion and all of the perfluoroguanidine has been consumed.

The components of the product mixture are separated and isolated by means of vapor phase chromatography. For this purpose a column 3 meters in length and ½ inch in diameter packed with perfluorotributylamine (33%) coated on acid-washed diatomaceous earth (e.g., Celite; 67%) is used. The column is operated at −30° C. An 8-volt thermistor is used as a detector and dry helium is used as the carrier gas. The column is operated in such a manner that the retention time of fluorotrichloromethane is approximately 30 min. after the air peak elutes. Table I gives the distribution of products isolated by the chromatography procedure and their respective elution times. Some variations in the relative amounts of products are observed in different experiments.

TABLE I

| Components of the product mixture | Relative retention time under described conditions ($T_{CFCl_3} = 100$) | Percentage of product mixture as determined by chromatography (uncorrected) |
|---|---|---|
| Air, $O_2$ | 0.0 | |
| $CF_4$, $SiF_4$, $NF_3$ | 0.6 | 0.3 |
| $CO_2$, $N_2O$ | 1.9 | 6.3 |
| $COF_2$ | 2.9 | 2.3 |
| $CF_3OF$ | 5.7 | 0.5 |
| $CF_3NF_2$ | 7.3 | 0.4 |
| $CF_2(OF)_2$ + trace $CF_3OOF$ | 9.9 | 18.5 |
| $\underset{\text{FCCN}}{\overset{O}{\|}}$ | 13.4 | 0.3 |
| $CF_3OCF_3$ | 17.2 | Trace |
| $CF_3NO_2$ | 19.1 | 0.5 |
| $FONO_2$ | 21.2 | 0.4 |
| $F_2NCF_2NF_2$ | 32.2 | 1.4 |
| Unknown | 38.8 | Trace |
| $CF_3OO\overset{O}{\underset{\|}{C}}F$ (Table II) | 48.7 | 5.4 |
| $CF_3OOOCF_3$ | 59.6 | 0.2 |
| $CF_3OOCF_2OF$ (Table III) | 71.0 | Trace |
|  | 78.3 | Trace |
| $CFCl_2$ | 100.0 | 45.0 |
| $(F_2N)_2CF$ | 181.2 | 17.2 |
| $(F_2N)_3CCN$, $CF_3OO\overset{O}{\underset{\|}{C}}OOCF_3$ (Table IV) $(F_2N)_2CFNO_2$ + uncharacterized products | >200 | 1.3 |

The components in the product mixture with retention times of 200 and higher are pooled (by backflushing the chromatography column described above after the $(F_2N)_3CF$ has eluted) and then rechromatographed under different conditions. For this purpose a column 2 meters in length and ½ inch in diameter packed with silicone gum rubber (commercially available as SE–30, from General Electric Company) (20%), coated on 30–60 mesh acid-washed diatomaceous earth (80%) and maintained at about 25° C. is used. An 8-volt thermistor is used as a detector and helium is used as the carrier gas.

The products are collected by preparative gas chromatography techniques. Previously known compounds are identified by comparison of their infrared and n.m.r. spectra with the spectra of authentic samples.

Novel compounds of the invention are further characterized as follows:

Fluoroformyl peruofiromethyl peroxide $$(CF_3OO\overset{O}{\underset{\|}{C}}F)$$

is a colorless gas at room temperature which is readily hydrolyzed by water, but can be stored over at least several months at room temperature with no decomposition in carefully and thoroughly dried glass vessels. This compound is an oxidizing agent and must not be contaminated by oxidizable materials. Table II summarizes the physical characteristics and analytical data for this compound.

TABLE II

Fluoroformyl perfluoromethyl peroxide, $$CF_3OO\overset{O}{\underset{\|}{C}}F$$

Infrared spectrum:
  Strong absorptions at 5.20, 7.70, 8.05 and 8.60 microns.
  Medium absorptions at 9.95 and 10.75 microns.

$F^{19}$ N.M.R. SPECTRUM

| Absorptions | 32.4φ | 69.5φ |
|---|---|---|
| Area ratio | 1 | 3 |
| Character | Fourfold | Doublet |
| Coupling constant | 2.0 c.p.s. | 2.0 c.p.s. |
| Assignment | $\overset{O}{\underset{\|}{F}}C-$ | $-CF_3$ |

Mass cracking pattern:
  Prominent peaks at $m/e = 28(CO^+)$, $44(CO_2^+)$, $47(COF^+)$, $63(CO_2F^+)$, $66(CF_2O^+)$, $69(CF_3^+)$.
  Highest two mass numbers observed at $m/e = 129$ (parent minus one fluorine) and $m/e = 148$ (parent).

Elemental analysis.—Calculated for $C_2F_4O_3$ (percent): C, 16.23; F, 51.34; M.W. 148. Found (percent): C, 16.26, 16.07; F, 49.1, 50.1, 144 (by gas density); 138 (by effusion rate in mass spectrometer)

Oxidizing power (in meq. iodine released per g. sample): Calculated for $$CF_3OO\overset{O}{\underset{\|}{C}}F$$

Found (percent): 13.51, 13.3.

Fluoroxyperfluoromethyl perfluoromethyl peroxide is a colorless gas at room temperature. Samples stored at room temperature in glass vessels for several months show no sign of decomposition. This compound is an oxidizing agent. It oxidizes ferrocene rapidly and is reduced to $COF_2$. Physical properties and analytical data are summarized in Table III.

TABLE III

Fluoroxyperfluoromethyl perfluoromethyl peroxide, $CF_3OOCF_2OF$

Infrared spectrum:
  Absorptions at 7.78μ (s.), 7.93μ (s.), 8.22μ (shoulder), 8.33μ (m.), 8.67μ (s.), and 10.67μ (v.w., OF region).

TABLE III—Continued

F[19] N.M.R. spectrum:

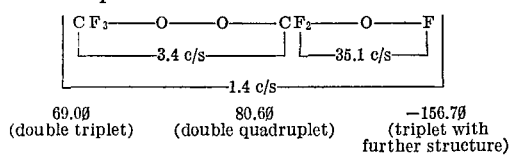

| 69.0φ | 80.6φ | −156.7φ |
| --- | --- | --- |
| (double triplet) | (double quadruplet) | (triplet with further structure) |

Mass cracking pattern:
  Largest intensity peak at $m/e=69(CF_3^+)$.
  Strong peaks at $m/e=47(CFO^+)$, $66(CF_2O^+)$ and $85(CF_3O^+)$.
  Medium intensity peaks at $m/e=28(CO^+)$ $31(CF^+)$, $35(OF^+)$, $44(CO_2^+)$, $50(CF_2^+)$, $63(CFO_2^+)$, $101(CF_3O_2^+)$ and $151(C_2F_5O_2^+)$.
  Weak intensity peaks at $m/e=(16(O^+)$, $19(F^+)$, $32(O_2^+)$, 70(isotope of $CF_3^+$), $82(CF_2O_2^+)$ and $148(C_2F_4O_3^+)$.

Elemental analysis.—Calculated for $C_2F_6O_3$: C, 12.9%; F, 61.3%; M.W. 186. Found: C, 13.0%; F, 59.6%; M.W. 183 (by gas density method).

Bis(perfluoromethyl) bis(peroxy)carbonate is a clear, colorless, volatile liquid at room temperature. It readily undergoes hydrolysis by water to $CO_2$ and $CF_3OOH$ but can be stored in thoroughly dried glass apparatus. Samples stored in this manner at room temperature show no sign of decomposition after several months. This compound is an oxidizing agent and must be kept free from oxidizable contaminants. Table IV summarizes physical and analytical data.

TABLE IV

Bis(perfluoromethyl)bis(peroxy)carbonate, $CF_3OO\overset{\overset{O}{\|}}{C}OOCF_3$

[Infrared spectrum (20–25 mm. Hg pressure, 25 mm. cell)]

| Wavelength (microns) | Intensity | Character |
| --- | --- | --- |
| 5.24 | Medium | Moderately sharp. |
| 7.70 | Strong | |
| 8.03 | Very strong | |
| 8.18 | Strong | All moderately sharp. Some overlap. |
| 8.77 | do | |
| 8.95 | Very strong | |
| 10.60 | Very weak | Broad. |
| 13.65 | Weak | Very broad. |

F[19] N.M.R. spectrum:
  Sharp singlet absorption at 69.6φ (—$CF_3$).

Mass cracking pattern:
  Prominent peaks at $m/e=28(CO^+)$, $44(CO_2^+)$, $47(CFO^+)$, $66(CF_2O^+)$, $69(CF_3^+,$ largest peak), $113(C_2F_3O_2^+)$ and $129(C_2F_3O_3^+)$,
  Peak at $m/e=129$ is approximately 20% of $CF_3^+$ peak and is highest mass number observed except for very small traces.

Bis(difluoramino)nitroperfluoromethane is a colorless gas at room temperature. No decomposition is observed in samples stored at room temperature over a period of several months. It is characterized by strong absorptions in the infrared spectrum at 6.2, 7.8, 10.2, 10.5 and 11.0 microns and in the mass spectrum at $m/e=30$ (assigned to $NO^+$), 31 (assigned to $CF^+$), 33 (assigned to $NF^+$), 46 (assigned to $NO_2^+$), 52 (assigned to $NF_2^+$), and 135 (assigned to $CF_5N_2^+$, i.e. $(F_2N)_2CF$—, the parent molecule minus $NO_2$). Bis(difluoramino)nitroperfluoromethane is an oxidizing agent and must be maintained free from oxidizable contaminants. It will be readily recognized that fluorinated nitro compounds such as bis(difluoramino)-nitroperfluoromethane, form in the process of the invention as the result of concomitant fluorinative and oxygenative oxidation.

The process of the invention in which alkali metal cyanide participates concomitantly with fluorinative oxidation by bis(fluoroxy)perfluoroalkane to convert fluorimino compounds to difluoramino nitriles, is shown by the formation of $(F_2N)_3CCN$ above.

The molar amount of OF compound used is varied from one to four times the molar amount of perfluoro-guanidine charged with little effect on the product distribution in this example.

The number of millimoles of volatile components in the product mixture is generally 10–20 percent less than the number of millimoles of volatile materials charged to the reactor. This difference is usually attributable to the formation of condensation products from the OF compound, so that the material balance in this procedure is greater than 95 percent.

EXAMPLE 2

A clean, dry 10-ml. borosilicate glass reaction vessel equipped with a Fischer and Porter Teflon valve is charged with 7.0 μl. distilled water. The reactor is then attached to the vacuum line and cooled in a bath of liquid nitrogen. Into the reactor is transferred under reduced pressure 0.22 mmole of fluoroformyl perfluoromethyl peroxide, prepared and isolated by the procedures described in Example 1. The reactor is then sealed with the Fischer and Porter valve and allowed to stand at room temperature for one hour.

The equation for this reaction is as follows:

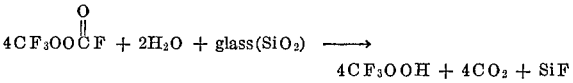

$$4CF_3OO\overset{\overset{O}{\|}}{C}F + 2H_2O + glass(SiO_2) \longrightarrow$$
$$4CF_3OOH + 4CO_2 + SiF$$

The reaction mixture is then fractionated by distillation at less than 1 mm. pressure through Trap A and into Trap B, cooled respectively at −110° C. and −196° C. At the conclusion of the fractionation Trap A is found to contain 0.14 mmole of perfluoromethyl hydroperoxide (Table V) contaminated slightly by water. Trap B is found to contain 0.18 mmole of material which is chiefly carbon dioxide and silicon tetrafluoride with a small amount of perfluoromethyl hydroperoxide.

The perfluoromethyl hydroperoxide from Trap A is further purified by distillation at less than 1 mm. pressure through Trap C (cooled by a slush bath of solid carbon dioxide and trichloroethylene at −78° C.) and into Trap D (cooled by a bath of liquid nitrogen at −196° C.). Trap D is then found to contain 0.097 mmole pure perfluoromethyl hydroperoxide. Trap C is found to contain chiefly water and traces of the hydroperoxide.

Perfluoromethyl hydroperoxide is a volatile liquid boiling near room temperature at 760 mm. pressure. It is an oxidizing agent and rapidly liberates iodine from aqueous solutions of potassium iodide. The hydroperoxide is stable for several months at room temperature in glass apparatus, even in the presence of moisture. The characterization of perfluoromethyl hydroperoxide by its chemical and spectral properties is summarized in Table V.

TABLE V

Perfluoromethyl hydroperoxide, $CF_3OOH$
[Infrared spectrum (27 mm. Hg pressure, 25 mm. cell)]

| Wavelength (microns) | Intensity | Character |
| --- | --- | --- |
| 2.80 | Medium | Very sharp. |
| 7.22 | do | Complex. |
| 7.85 | Very strong | Do. |
| 8.14 | do | Do. |
| 8.95 | Very weak | |
| 10,58 | do | |

F[19] n.m.r. spectrum:
  Sharp singlet absorption at 70.7φ (—$CF_3$).

Mass cracking pattern:
  Prominent peaks are found at $m/e=47(CFO^+)$ and $69(CF_3^+;$ largest peak).
  Medium intensity peaks are found at $m/e=20(HF^+)$, $28(CO^+)$, $44(CO_2^+)$, $66(CF_2O^+)$ and $67(CF_2OH^+)$.
  Lower intensity peaks are found at $m/e=16(O^+)$, $17(OH^+)$, $19(F^+)$, $31(CF^+)$, $32(O_2^+)$, $50(CF_2^+)$, $83(CF_2O_2H^+)$, $85(CF_2O^+)$ and $102(CF_3O_2H^+;$ parent).

Elemental analysis.—Calculated for $CHF_3O_2$: C, 11.77%; F, 55.87%; M.W. 102; Found: C, 11.7, 11.9%; F, 53.4, 54.8%; M.W. 105.

EXAMPLE 3

The hydrolysis procedure of Example 2 is repeated employing 5.0 μl. of distilled water and 0.28 mmole of pure fluoroformyl perfluoromethyl peroxide (from Example 1). The amount of water used in this example is carefully limited and 15 hours is allowed for the reaction. This reaction is as follows:

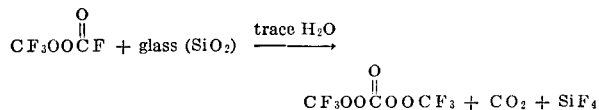

This result is not accomplished in the presence of excessive water.

The reaction mixture is fractionated, as described in Example 2 above, between Traps A and B cooled as described. At the conclusion of fractionation Trap A contains 0.11 mmole of bis(perfluoromethyl) bis(peroxy)carbonate, slightly contaminated by silicon tetrafluoride and traces of water and Trap B contains carbon dioxide and silicon tetrafluoride. The contents of Trap A are further fractionated at less than 1 mm. pressure through Trap C at −63° C. (which removes water) and into Trap D (cooled by liquid nitrogen at −196° C.). Pure bis(perfluoromethyl) bis(peroxy)carbonate is recovered from Trap D and identified by comparison of its infrared and n.m.r. spectra with the product of Example 1.

EXAMPLE 4

The hydrolysis procedure of Example 3 is repeated employing 1.0 μl. of distilled water with 0.01 mmole bis(perfluoromethyl) bis(peroxy)carbonate. This amount of water is in several fold excess and a reaction time of about 15 hours is allowed so that the reaction is:

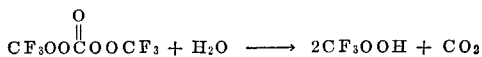

The reaction mixture is fractionated as above using traps at −110° C. and −196° C. Perfluoromethyl hydroperoxide is recovered from the trap at −110° and is further purified by the procedure described in Example 2 and found to be identical with the same compound there described.

EXAMPLE 5

The product from the reaction of 0.59 mmole bis(fluoroxy)-perfluoromethane and 0.59 mmole perfluoroguanidine in 0.99 mmole trichlorofluoromethane and employing 31 mg. potassium cyanide as catalyst according to the procedure described in Example 1 is fractionated at less than 1 mm. pressure between traps cooled at −93° C. and −196° C., respectively. At the same time a clean, dry 10-ml. borosilicate glass reaction vessel equipped with a Fischer and Porter Teflon valve is charged with 9.0 μl. of distilled water. The reactor is then attached to the vacuum line and cooled in a bath of liquid nitrogen. At the conclusion of the fractionation procedure the material in the second trap (−196° C.) is transferred under reduced pressure to the reaction vessel containing the water. The reactor is sealed with the Fischer and Porter valve and then allowed to stand for two days at room temperature with occasional shaking.

The reaction mixture is then fractionated at less than 1 mm. pressure between traps cooled at −93° C. and −196° C., respectively. Perfluoromethyl hydroperoxide collects in the first trap (−93° C.) and is purified according to the procedure in Example 2 to give material having identical properties.

EXAMPLE 6

This example illustrates the process for fluorinating fluoroformyl perfluoromethyl peroxide with an alkali metal fluoride as catalyst. Precondition of the catalyst is carried out as follows.

A clean, well-dried 75-ml. Hoke stainless steel cylinder (rated at 1800 p.s.i.) equipped with a 2-in. stainless steel nipple and a Hoke No. Y343H stainless steel valve is evacuated and then charged to 1 atm. pressure with fluorine at room tempertaure. Care must be taken to assure that all (hydrocarbon or silicone) grease is removed from the cylinder and the valve before the fluorine is charged. The cylinder is then allowed to stand at room temperature for one day. The fluorine is then discharged, and the cylinder is opened in a dry box (<4 p.p.m. moisture content) and, while still therein, charged with 3.0 g. of finely ground cesium fluoride (used as obtained commercially). The cylinder is reassembled in the dry box and is then removed and attached to a vacuum line. The cylinder is heated overnight in a thermostatted bath at 150° C. while the contents are kept at less than 1 mm. pressure to dry the cesium fluoride thoroughly. The cylinder is then filled to 1 atm. pressure with fluorine and kept at room temperature in this manner for at least one day. It is then ready for use.

The cylinder is evacuated and cooled in a bath of liquid nitrogen. Pure fluoroformyl perfluoromethyl peroxide (0.40 mmole) is condensed therein under reduced pressure and the cylinder is then charged with 1.08 mmoles fluorine (ca. 95%, i.e. commercial purity) at liquid nitrogen temperature. The cylinder valve is closed, and the cylinder is placed in a slush bath of solid carbon dioxide and trichloroethylene (−78° C.) and left there for thirty minutes. The cylinder is then transferred to a bath at −30° C., where it is allowed to remain overnight (about 16 hours). The reaction is:

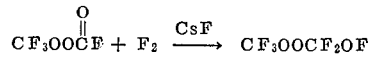

The cylinder is again cooled in a liquid nitrogen bath and residual gases are removed under reduced pressure. The cylinder is then allowed to warm to room temperature, and the volatile materials therein are transferred to the vacuum line. The product (0.33 mmole; 81% yield) is pure fluoroxyperfluoromethyl perfluoromethyl peroxide, purified and characterized as in Example 1.

Finally, the cylinder is filled to 1 atm. pressure with fluorine and stored at room temperature until used in another experiment. Care must be exercised that no air is allowed to get into the cylinder between experiments and that the starting materials are rigorously dried prior to use.

EXAMPLE 7

The cylinder described in Example 6 (containing cesium fluoride and fluorine) is attached to a vacuum line and, after removal of fluorine, as in Example 6, it is cooled in a bath of liquid nitrogen and pure bis(perfluoromethyl) bis(peroxy)carbonate (0.097 mmole) is condensed into the cylinder under reduced pressure. The cylinder is then charged at liquid nitrogen temperature with 0.33 mmole fluorine. The cylinder valve is closed and the cylinder is placed in a bath at −78° C., where it is allowed to remain for twenty-one hours. The reaction is:

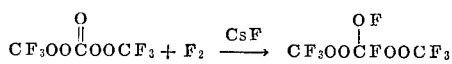

After this period of time the cylinder is again cooled in a bath of liquid nitrogen, and the non-condensible gases are removed under vacuum. The cylinder is then allowed to warm to room temperature, and the volatile materials therein are transferred to the vacuum line. There is obtained 0.083 mmole of pure fluoroxybis(perfluoromethylperoxy)fluoromethane having the properties described below.

The cylinder used in this experiment is then filled to 1 atm. pressure with fluorine and stored at room temperature as in Example 6.

Fluoroxybis(perfluoromethylperoxy)fluoromethane, (CF$_3$OO)$_2$CFOF is characterized by its infrared and n.m.r. spectra, mass cracking pattern and elemental analysis.

The infrared spectrum has very strong complex absorption in the region of 7.70–8.10μ with peaks at 7.73μ, 7.88μ, and 8.02μ; strong complex absorption with peaks at 8.60μ and 8.87μ; and weak broad absorption at 10.6μ.

The N.M.R. spectrum has three absorption peaks in the approximate ratio 1:6:1 at −168.φ, +68.7φ and +90.6φ, respectively. The peak at +68.7φ is a doublet with a coupling constant of approximately 3.5 c./s. and is assigned to the fluorines of the CF$_3$ group in the product. The peaks at −168.0φ and at +90.6φ are both overall doublets with coupling constants near 25 c./s. Further fine structures in these peaks are also present under conditions of high resolution. On the basis of positions of the absorptions, the absorption at −168.0φ is assigned to the fluorine of the OF group and the absorption at +90.6φ is assigned to the fluorine of the CF group.

*Analysis.*—Calculated for C$_3$F$_8$O$_5$ (percent): C, 13.43; F, 56.72. Found (percent): C, 13.05; F. 55.50.

Fluoroxybis(perfluoromethylperoxy)fluoromethane is an oxidizing agent which liberates iodine from an aqueous solution of potassium iodide. This product is stable at room temperature. A sample of fluoroxybis(perfluoromethylperoxy)fluoromethane in trichlorofluoromethane stored at room temperature in a glass N.H.R. tube over a period of several months shows no decomposition.

The mass cracking pattern of the fluoroxybis(perfluoromethylperoxy)fluoromethane shows prominent peaks at mass numbers (m/e) 44(CO$_2$+), 47(CFO+, largest peak) and 69(CF$_3$+). Medium intensity peaks appear at mass numbers 28(CO+), 63(CFO$_2$+) and 66(CF$_2$O+). Peaks of somewhat lower intensity appear at mass numbers 16(O+), 19(F+), 31(CF+), 32(O$_2$+), 50(CF$_2$+), 85(CF$_3$O+), 113(C$_2$F$_3$O$_2$+) and 129(C$_2$F$_3$O$_3$+). The absence of peaks in the pattern corresponding to fragments containing carbon to carbon bonds or elements other than C, F and O is further evidence for the structure.

EXAMPLE 8

The procedure of Example 1 is repeated employing 20 mg. of anhydrous potassium fluoride as catalyst and 0.2 ml. of dry perfluorotributylamine as diluent in a 1–2 ml. reaction vessel. No stirrer is used on this scale. Pure perfluoroguanidine (0.37 mmole) is introduced under reduced pressure and, after sealing, the tube is allowed to warm to just below room temperature, the contents are mixed thoroughly and the tube is then cooled by a liquid nitrogen bath. Bis(fluoroxy)perfluoromethane (0.34 mmole) is condensed in the tube under reduced pressure and the tube is finally sealed by the Fischer and Porter valve and allowed to warm slowly to room temperature and to stand for 4 weeks at room temperature. Analysis by N.M.R. spectroscopy shows the presence of tris(difluoramino)fluoromethane and fluoroformyl perfluoromethyl peroxide as the major products of the reaction. The products are transferred to a vacuum line and separated and characterized according to the procedures given in Example 1. The total product is found to consist of essentially the same compounds as in Table I except that trichlorofluoromethane, tris(difluoroamino)acetonitrile, and fluoroformyl cyanide are not present.

EXAMPLE 9

The apparatus used in Example 1 is thoroughly cleaned and dried and is then charged with 478.8 mg. of dry reagent potassium cyanide and 0.7 ml. of dry perfluorotributylamine. The reactor is then cooled in a bath of liquid nitrogen and charged under reduced pressure with 3.0 mmoles of pure perfluoroformamidine at liquid nitrogen temperature. The cooling bath is removed and the reaction vessel is allowed to warm to room temperature while the mixture is stirred for a few minutes to give thorough mixing. This step is a safety procedure found helpful for avoiding explosions. The reactor is then cooled again in a liquid nitrogen bath and charged under reduced pressure with 4.0 mmoles of pure bis(fluoroxy)perfluoromethane. The reactor is sealed with a Fischer and Porter valve and placed in a slush bath at −110° C., which is allowed to warm slowly to room temperature overnight. The reaction mixture is stirred with a magnetic stirring bar as it warms and at room temperature for eight hours thereafter. It is then cooled at −30° C., and the volatile components at that temperature are transferred to the vacuum line. The products are fractionated by distillation at less than 1 mm. pressure through traps at about −93° C. and −196° C., respectively.

At the conclusion of the distillation, the −93° C. trap is found to contain 0.16 mmole of product consisting chiefly of bis(perfluoromethyl)bis(peroxy)carbonate. Small amounts of bis(perfluoromethyl) trioxide, fluoroxyperfluoromethyl perfluoromethyl peroxide, and difluoraminonitroperfluoromethane are also present, as well as small amounts of uncharacterized contaminants. The −196° C. trap contains 5.14 mmoles of products, the major components of which are bis(difluoramino)perfluoromethane and fluoroformyl perfluoromethyl peroxide. The components of both traps are separated by vapor phase chromatography following the procedures described in Example 1.

Difluoraminonitroperfluoromethane is a colorless gas at room temperature. No decomposition is observed in samples stored at room temperature over a period of several months. This compound is an oxidizing agent and must be maintained free from oxidizable contaminants. Table VII summarizes physical and analytical data for difluoraminonitroperfluoromethane.

TABLE VII

Difluoraminonitroperfluoromethane, F$_2$NCF$_2$NO$_2$

Infrared spectrum:

Absorptions at 3.39μ (v.w.), 6.16μ (s.), 7.59μ (s.), 8.08μ (s.), 8.96μ (w.), 9.22μ (w.), 10.15μ (m.), 10.63μ (m.), 11.85μ (m.), 12.72μ (m.) and 13.87μ (w.).

F$^{19}$ N.M.R. spectrum:

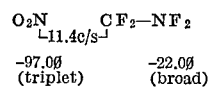

−97.0φ     −22.0φ
(triplet)     (broad)

Mass spectrum:

Prominent peaks appear at mass numbers (m./e) 30(NO+), 31(CF+), 33(NF+), 46(NO$_2$+), 50(CF$_2$+), 52(NF$_2$+), 64(CNF$_2$+), 69(CF$_3$+), 83(CNF$_3$+) and 102(CNF$_4$+, parent molecule minus NO$_2$).

EXAMPLE 10

The procedure of Example 9 is repeated employing a different oxidant. The apparatus described in Example 9 is thoroughly cleaned and dried and then charged with 248.3 mg. of dry reagent potassium cyanide and 0.25 ml. of dry perfluorotributylamine. Following the procedure of Example 9, 0.80 mmole of pure perfluoroformamidine is condensed in the reaction vessel, the cooling bath is removed, and the reaction vessel is allowed to warm to room temperature. After stirring for a few minutes, the reactor is again cooled to about −196° C. and is charged under reduced pressure with 1.06 mmole 1,1-bis(fluoroxy)perfluoroethane. The reaction procedure and subsequent fractionation procedure of Example 9 are followed except that the first trap is cooled in a slush bath of fluorotrichloromethane at −110° C.

After fractionation the −110° C. trap is found to contain 0.31 mmole of product which is chiefly perfluoroacetyl perfluoroethyl peroxide, perfluoroacetyl perfluoromethyl peroxide, fluoroformyl perfluoroethyl peroxide and difluoraminonitroperfluoromethane, as well as small amounts of other components. The −196° C. trap contains 1.44 mmoles of product mixture, the components of which are separated as in Example 9 and are as shown in Table VIII. Some variations in the relative amounts of products are observed in different experiments.

TABLE VIII.—PRODUCTS IN 196° C. TRAP

| Component | Percentage of product mixture as determined by chromatography (uncorrected) |
|---|---|
| Air, $O_2$ |  |
| $CF_4$, $NF_3$, $SiF_4$ | 2.9 |
| $CO_2$, $N_2O$, $COF_2$ | 21.4 |
| $CF_3NF_2$ | 1.4 |
| $CF_3\overset{O}{\overset{\|}{C}}F_3$ | 17.7 |
| $CF_3OCF_3$ | 0.8 |
| $CF_3NO_2$ | 1.9 |
| $CF_3OOCF_3$ | 3.1 |
| $CF_3\overset{O}{\overset{\|}{C}}CN$ | Trace |
| $F_2NCF_2NF_2$ | 49.6 |
| $CF_3OO\overset{O}{\overset{\|}{C}}F$ | 0.8 |
| $CF_3OOCF_3$ | 0.4 |
| Unidentified components | Trace |

The components of the −110° C. trap are separated and isolated by vapor phase chromatography using a 6-meter column of silicone gum rubber similar to the 2-meter silicone gum rubber column described in Example 1 and following the procedures described therein.

Difluoraminonitroperfluoromethane prepared in this manner is identified by its infrared and N.M.R. spectra and found to be identical to samples prepared by the techniques described in Example 9.

Novel compounds of the invention prepared in this example are further characterized as follows:

Perfluoroacetyl perfluoroethyl peroxide is a volatile liquid with a boiling point near room temperature at 1 atm. pressure. This compound is stable at room temperature if stored in carefully dried apparatus. In the presence of moisture or by the procedure of Example 2, hydrolysis occurs readily to perfluoroacetic acid and perfluoroethyl hydroperoxide. This compound is an oxidizing agent and must not be contaminated by oxidizable materials. Table IX summarizes the physical characteristics and analytical data for this compound. Perfluoroacetyl perfluoroethyl peroxide can also be named perfluoroethyl perfluoroperacetate.

TABLE IX

Perfluoroacetyl perfluoroethyl peroxide $$CF_3\overset{O}{\overset{\|}{C}}OOCF_2CF_3$$

Infrared spectrum:
Absorptions at 5.36μ (medium), 7.25μ (weak), 7.68μ (weak), 8.04μ (strong), 8.33μ (strong), 9.13μ (medium), and 9.40μ (strong).

F[19] N.M.R. spectrum:

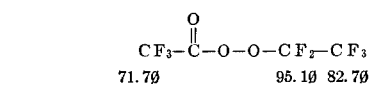

$$CF_3-\overset{O}{\overset{\|}{C}}-O-O-CF_2-CF_3$$
71.7ø         95.1ø  82.7ø

Approximate area ratios     3         2     3

Coupling constants observed under high resolution are very small (J<2 c./s.) and unresolved.

Mass cracking pattern:
Prominent peaks appear at mass numbers (m/e) 28(CO+), 31(CF+), 44$CO_2^+$), 47(COF+), 50-($CF_2^+$), 69($CF_3^+$, largest peak) and 97($C_2F_3O^+$).

Medium intensity peaks appear at mass numbers 66($CF_2O^+$) and 119($C_2F_5^+$).

Lower intensity peaks appear at mass numbers 16(O+), 19(F+), 32($O_2^+$), 70($CF_3^+$ isotope) and 151($C_2F_5O_2^+$, parent molecule minus $CF_3CO^+$).

No significant peaks appear at mass numbers greater than 151.

Elemental analysis.—Calculated for $C_4F_8O_3$ (percent): C, 19.36; F, 61.30; M.W. 248. Found: (percent): C, 19.4; F. 61.3; M.W. 249 (by gas density), 242 (effusion rate in mass spectrometer at mass numbers 47, 69, 97 and 119).

Perfluoroacetyl perfluoromethyl peroxide is a colorless gas at room temperature. This compound is stable at room temperature if stored in carefully dried apparatus. In the presence of moisture, or by the procedure of Examples 2 to 4, hydrolysis occurs rapidly to perfluoromethyl hydroperoxide and perfluoroacetic acid. This compound is an oxidizing agent and must not be contaminated by oxidizable materials. Table X summarizes the physical characteristics and analytical data for this compound. Perfluoroacetyl perfluoromethyl peroxide can also be named perfluoromethyl perfluoroperacetate.

TABLE X

Perfluoroacetyl perfluoromethyl peroxide

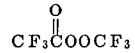

$$CF_3\overset{O}{\overset{\|}{C}}OOCF_3$$

Infrared spectrum:
Absorptions at 5.35μ (medium), 7.70μ (strong), 8.04μ (strong), 8.25μ (strong), 9.35μ (strong), 10.62μ (weak), 11.19μ (weak), 11.79μ (weak) and 13.48μ (weak).

F[19] N.M.R. spectrum:

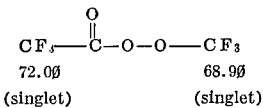

$$CF_3-\overset{O}{\overset{\|}{C}}-O-O-CF_3$$
72.0ø                    68.9ø
(singlet)              (singlet)

Both peaks have the same intensity and approximately the same area.

Mass cracking pattern:
Largest peak appears at mass number (m/e) 69($CF_3^+$).

Prominent peaks appear at mass numbers 28(CO+), 31(CF+), 44($CO_2^+$), 47(CFO+), 50($CF_2^+$), 66($CF_2O^+$) and 97($C_2F_3O^+$).

Peaks of much smaller intensity appear at mass numbers 16(O+), 19(F+), 63($CFO_2^+$) and 1951($C_2R_5O_2^+$).

Molecular weight:
Calculated for $C_3F_6O_3$: 198.
Fonund: (by effusion rates in mass spectrometa) 193 (at m/e=47), 200 (at m/e=50), 195 (at m/e=69 and at m/e=97).

Fluoroformyl perfluoroethyl peroxide is a colorless gas at room temperature. This compound is stable at room temperature if stored in carefully dried apparatus. In the presence of moisture or by the procedures of Example 2 above, hydrolysis occurs rapidly to perfluoroethyl hydroperoxide, carbon dioxide and hydrogen fluoride. This compound is an oxidizing agent and must not be contaminated by oxidizable materials. Table XI summarizes the physical characteristics and analytical data for this compound.

TABLE XI

Fluoroformyl perfluoroethyl peroxide

$$F\overset{O}{\overset{\|}{C}}OOCF_2CF_3$$

TABLE XI—Continued

Infrared spectrum:
  Absorptions at 5.21µ (strong), 7.24µ (medium), 8.04µ (strong), 8.30µ (strong), 8.50µ (strong), 9.14µ (strong), 9.34µ (medium), 9.70µ (medium), 10.10µ (medium) 11.05µ (weak), 11.84µ (weak) and 13.39µ (medium).

$F^{19}$ N.M.R. spectrum:

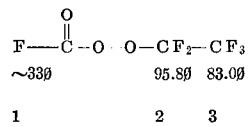

| | F—C(=O)—O | O—CF$_2$— | CF$_3$ |
|---|---|---|---|
| | ~330 | 95.80 | 83.00 |
| Approximate area ratio | 1 | 2 | 3 |

Coupling constants observed under high resolution are very small (J<2 c./s.) and unresolved.

Mass cracking pattern:
  Largest peak appears at mass numbers (m/e) 69 (CF$_3$+).
  Prominent peaks appear at mass numbers 44(CO$_2$+), 47(CFO+) and 119(C$_2$F$_5$+).
  Medium intensity peaks appear at mass numbers 28(CO+), 31(CF+), 50(CF$_2$+), 66(CF$_2$O+) and 129(C$_2$F$_3$O$_3$, parent molecule minus CF$_3$).
  Peaks of much smaller intensity appears at mass numbers 19(F+), 22(CO$_2$++), 63(CFO$_2$+), 93 (C$_2$F$_3$O+) and 116(C$_2$F$_4$O+).

Molecular weight:
  Calculated for C$_3$F$_6$O$_3$: 198. Found: (by effusion rates in mass spectrometer) 184 (at m/e=69), 190 (at m/e=100), 195 (at m/e=97 and at m/e=116), 192 (at m/e=119) and 183 (at m/e=129).

EXAMPLE 11

A clean, dry borosilicate glass N.M.R. tube fitted with a Fischer and Porter Teflon valve is charged with 60.4 mg. anhydrous reagent potassium cyanide and is then cooled to −196° C. and further charged under reduced pressure successively with 0.205 mmole of pure perfluoroformamidine and 0.83 mmole of freshly distilled trichlorofluoromethane (previously dried over P$_2$O$_5$). After warming to room temperature and thorough mixing of the perfluoroformamidine and solvent, the tube is again cooled to −196° C. and charged under vacuum with 0.26 mmole of 1-fluoroxyperfluoroethyl perfluoroethyl peroxide containing bis(1-fluoroxyperfluoroethyl) peroxide. The tube is sealed, placed in a bath at −110° C. and allowed to warm slowly to room temperature overnight. It is then allowed to stand at room temperature for one day. The reaction mixture is found to contain chiefly perfluoroacetyl perfluoroethyl peroxide, bis-(difluoroamino(perfluoromethane, and perfluoroacetyl fluoride. Perfluoroacetyl perfluoroethyl peroxide is separated from the reaction mixture and characterized as in Example 10.

EXAMPLE 12

Essentially the procedure of Example 8 is repeated employing, however, 52.2 mg. of anhydrous reagent potassium fluoride, 0.202 mmole perfluorocyanoformamidine (a mixture of isomers) and 1.00 mmole of freshly distilled trichlorofluoromethane (previously dried over P$_2$O$_5$). After warming to permit thorough mixing of the perfluorocyanoformamidine with the solvent, the vessel is cooled to −196° C. and charged under reduced pressure with 0.50 mmole of pure bis(fluoroxy)perfluoromethane. The reaction proceeds for two days at room temperature before working up as described above. Fluoroformyl perfluoromethyl peroxide (Table II) and bis(difluoramino)perfluoroacetonitrile are identified in the reaction mixture by N.M.R. absorption spectroscopy and are isolated from the product mixture by vapor phase chromatography employing a 3 meter column and the components described in Example 1.

EXAMPLE 13

The procedure of Example 9 is repeated in a smaller reactor without stirrer employing 139.7 mg. of reagent anhydrous sodium carbonate, 0.51 mmole of pure perfluoroformamidine and 1.00 mmole of freshly distilled trichlorofluoromethane (previously dried over P$_2$O$_5$). Following the warming and cooling cycle as in Example 9, 0.76 mmole of pure bisfluoroxy)perfluoromethane is added and the reaction is carried out as before but maintained at room temperature for seven days. The product mixture is found to be similar in composition to the product mixture in Example 9 by N.M.R. absorption spectroscopy and by separation and isolation of components as described above.

EXAMPLE 14

The procedure of Example 13 is repeated using 104.0 mg. of reagent anhydrous sodium oxalate, 0.49 mmole of pure perfluoroformamidine, 1.00 mmole of freshly distilled trichlorofluoromethane (previously dried over P$_2$O$_5$) and, after warming and cooling as before, 0.76 mmole of pure bis(fluoroxy)perfluoromethane. The reaction is carried out, as in Example 9, for seven days at room temperature with closely similar results.

EXAMPLE 15

The apparatus used in this example consists of two, cylindrical, thick-walled borosilicate-glass pressure-vessels joined by a connecting arm equipped with a stopcock. Each vessel, designated A and B, respectively, has a volume of 75 ml. The apparatus is provided with a heating bath extending up to the connecting arm on both sides, so that both sides may be heated simultaneously. After thorough cleaning and drying, the apparatus is evacuated and one side (A) is charged with 0.26 mmole of pure bis(fluoroxy)perfluoromethane and the other (B) with 5.2 mmoles of pure tetrafluorohydrazine. The apparatus is then immersed in the thermostatically controlled oil bath at 175–180° C. After the reactants have reached bath-temperature, the stopcock in the connecting arm is opened long enough to equalize pressure and again closed. The apparatus is kept in the oil bath for ten minutes and is then allowed to cool to room temperature.

The infrared spectrum of the contents of side A shows that the mixture contains carbonyl fluoride, nitrogen trifluoride, tetrafluorohydrazine, carbon tetrafluoride, and difluoroaminoxyperfluoromethane. Side B contains pure tetrafluorohydrazine.

The products in side A are separated by vapor phase chromatography at −30° C. using a 3 meter column packed with perfluorotributylamine on acid-washed diatomaceous earth (67%) as above with detectors and carrier as above. The retention time of tetrafluorohydrazine is approximately 5 minutes after the air peak elutes.

The infrared spectrum of difluoroaminoxyperfluoromethane has strong, sharp absorptions at 7.7, 8.0 and 8.2 microns and broad absorptions of lower intensity at 10.6 and 11.5 microns. The N.M.R. spectrum has absorptions at +63.0φ and −125.7φ. The absorption at +63.3φ is a triplet with a coupling constant of 2.5 cycles per second. This absorption is assigned to the fluorines of the CF$_3$ group. The absorption at −125.7φ is broad and is assigned to the fluorines of the NF$_2$ group. The mass spectrum of difluoraminoxyperfluoromethane has prominent peaks at mass numbers (m/e) 28(CO+), 30(NO+), 31(CF+), 33(NF+), 47(CFO+), 50(CF$_2$+), 52(NF$_2$+), 66(CF$_2$O+) and 69(CF$_3$+). There are no prominent peaks above mass number 69. Values for the molecular weight determined by the effusion rate in the mass spectrometer are 132 (at m/e=47), 129 at m/e=52) and 140 at m/e=69). The calculated value is 137.

The reaction described herein may also be carried out using the same procedure at room temperature rather than at 175–180° C., but reaction times of upwards of thirty minutes are required.

EXAMPLE 16

This example illustrates the oxidative fluorination of acetonitrile in the process of the invention. A vessel as used in the above examples is charged with 0.35 ml. of anhydrous acetonitrile and then, under reduced pressure at −196° C., with 0.32 mmole of pure bis(fluoroxy)perfluoromethane. The vessel is sealed and allowed to stand at room temperature for 45 minutes, when it is cooled again to −196° C. and charged under reduced pressure with 1.00 mmole of freshly distilled trichlorofluoromethane (dried over $P_2O_5$ prior to use). The tube is then resealed and allowed to stand at room temperature for eight hours. After this period of time the N.M.R. spectrum of the sample shows that the major products of the reaction are α-fluoroacetonitrile and carbonyl fluoride, in addition to products resulting from etching of the glass vessel by hydrogen fluoride, which is a byproduct of the reaction. Lesser amounts of other products are also present.

The volatile components in the product mixture are then fractionated at less than 1 mm. pressure between a trap at about −78° C. (A) and a second trap (B) at −196° C. Trap A collects acetonitrile and α-fluoroacetonitrile. More volatile products such as acetyl fluoride, $CF_3CH_3$, $CFCl_3$, $SiF_4$, $COF_2$, $N_2O$ and $CO_2$ collect in trap B.

The products in Trap A are separated by vapor phase chromatography using a column 18 feet in length and ½ inch in diameter packed with poly(trichlorofluoroethylene) (33%) coated on acid-washed diatomaceous earth (67%), and their infrared and N.M.R. spectra are compared with the corresponding spectra of authentic samples.

EXAMPLE 17

The procedure of the invention as described in Example 16 is repeated using 120 mg. of methyl trifluoroacetate, 0.98 mmole of freshly distilled trichlorofluoromethane (dried over $P_2O_5$ prior to use) and 0.50 mmole of pure bis(fluoroxy)perfluoromethane. Reaction time is two days at room temperature.

Fractionation of the reaction mixture followed by vapor phase chromatography as described hereinabove gives fluoromethyl trifluoroacetate having a characteristic triplet absorption in its N.M.R. spectrum at $+160.1\phi$ with a coupling constant (J) of 46 cycles per second (assigned to the fluorine of the $CFH_2$ group) and a strong singlet absorption at $+76.2\phi$ (assigned to the fluorines of the $CF_3$ group). Flouromethyl trifluoroacetate is stable at room temperature under anhydrous conditions. In the presence of moisture it hydrolyzes rapidly to trifluoroacetic acid.

Selective fluorinative oxidation of higher homologous alkyl esters provides the α-fluoroalkyl esters as the major single product with smaller amounts of isomeric more distally fluorinated alkyl esters. Thus ethyl trifluoroacetate provides α-fluoroethyl trifluoroacetate in major amounts and β-fluoroethyl trifluoroacetate in minor amounts. These esters are characterized by the common N.M.R. absorption at about $+77\phi$ corresponding to the $CF_3$ group and complex absorptions at $+124.0\phi$ and $+226.4\phi$, respectively, corresponding to the fluorines of the —CFH— and —$CFH_2$ groups. The mono-α-fluoroalkyl esters are found generally to be susceptible to hydrolysis in the presence of water.

Diethyl perfluoroglutarate is similarly fluorinatively oxidized and gives ethyl mono-α-fluoroethyl perfluoroglutarate as the major product together with minor amounts of the β-fluoro-ethyl isomer and small amounts of the symmetrical and asymmetrical di(monofluoroethyl)perfluoroglutarates all of which are characterized by N.M.R. absorption as above.

Fluoroformyl esters of α-fluoroalcohols are available by the procedure of British Pat. 909,364.

EXAMPLE 18

Anhydrous methanol (0.25 mmole) in 0.94 mmole of freshly distilled trichlorofluoromethane is fluorinatively oxidized by the above procedure with 0.25 mmole of pure bis(fluoroxy)perfluoromethane first at −110° C. and then, after warming over 16 hours to room temperature, at room temperature for 5 hours.

At the end of this time, methyl fluoroformate is separated from the reaction mixture by the procedures described above and identified by comparison of its infared and N.M.R. spectra with the spectra of authentic samples.

EXAMPLE 19

Freshly distilled anhydrous benzene (0.25 mmole) in 0.94 mmole of freshly distilled trichlorofluoromethane (previously dried over $P_2O_5$ (is fluorinatively oxidized as described above with 0.25 mmole of pure bis(fluoroxy) perfluoromethane. After warming slowly to room temperature overnight from −110° C., the reaction is permitted to proceed at room temperature for one day. At the conclusion of this period, fluorobenzene is isolated from the reaction mixture by vapor phase chromatography using a column of silicone gum rubber. Fluorobenzene is identified by comparison of its infrared and N.M.R. spectra (absorption at $+113\phi$) with the spectra of an authentic sample.

When this procedure is repeated employing other aromatic compounds, fluorinative oxidative proceeds by the process of the invention to provide monofluorinated products identified by infrared and N.M.R. spectra. Thus, nitrobenzene yields fluoronitrobenzene, naphthalene yields fluoronaphthalene and pyridine yields fluoropyridine.

EXAMPLE 20

Pure freshly distilled perfluorocapronitrile (0.50 mmole) dissolved in 1.0 mmole of freshly distilled trichlorofluoromethane (dried over $P_2O_5$ prior to use) is fluorinatively oxidized with 0.66 mmole of pure bis(fluoroxy)perfluoromethane (added by the above described procedures) by heating the well mixed solution at 145–150° C. for six hours. After cooling, the N.M.R. spectrum of the mixture shows the presence in the reaction mixture of carbonyl fluoride, perfluorocaproyl fluoride and nitro perfluoro-n-hexane as well as unchanged starting materials. It will be recognized that the nitro perfluoro-n-hexane-nitrate results from concomitant fluorinative and oxygenative oxidation.

The mixture is separated by vapor phase chromatography employing a column of polytrichlorofluoroethylene (33%) on acid-washed diatomaceous earth (67%) with detector and carrier as above.

The products are identified by their infrared and N.M.R. spectra. Perfluorocaproyl fluoride has absorptions in the N.M.R. spectrum at $-23.9\phi$ (assigned to the fluorine of the acid fluoride group, at $+118.6\phi$ (assigned to the two fluorines on the carbon atom adjacent to the acid fluoride group), and near $+81\phi$, $+127\phi$, and $+123\phi$ (complex absorptions assigned to the fluorines on the four remaining carbons of the perfluoroalkyl group). The infarared spectrum of this compound has an absorption at 5.3 microns (attributed to the acid fluoride group) and complex absorptions in the region of 7–10 microns (attributed to the perfluoroalkyl chain).

Nitro-perfluoro-n-hexane has absorptions in the N.M.R. spectrum at $98.0\phi$ (assigned to the two fluorines on the carbon atom bearing the nitro group) and near $+81\phi$, $+127\phi$ and $+123\phi$ (complex absorptions assigned to the fluorines on the five remaining carbons of the perfluoro-n-hexyl group). The infrared spectrum of this compound has an absorption at 6.2 microns (attributed to the nitro group attached to a perfluoroalkyl chain) and complex absorptions in the region 7–10 microns (attributed to the perfluoroalkyl chain).

Other products isolated are carbon dioxide, carbonyl fluoride, silicon tetrafluoride, and nitrous oxide.

EXAMPLE 21

This example particularly illustrates the fluorinative oxidation of the imine of hexafluoroacetone. A vessel as used in the above examples is charged under reduced pressure at −196° C. with 0.50 mmole of the imine of hexafluoroacetone, 1.0 mmole of freshly distilled trichloromethane (dried over $P_2O_5$ prior to use) and 0.25 mmole of pure bis(fluoroxy)perfluoromethane. The vessel is sealed and allowed to stand at room temperature for one day. After this period of time the major products of the reaction are 2-fluoraminoperfluoropropane and carbon dioxide. Lesser amounts of other products are also present.

2-fluoraminoperfluoropropane is identified by its N.M.R. spectrum, which is shown in the following schematic drawing:

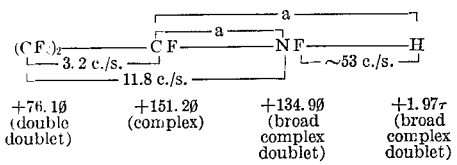

2-fluoramino perfluoropropane is unstable in the reaction mixture at room temperature on prolonged standing. After standing at room temperature for six days, the reaction mixture is again examined and the N.M.R. spectrum of the sample shows that the above initial product has dehydrohalogenated to give N-fluoroperfluoroisopropylidenimine, which is isolated by vapor phase chromatography on a column of fluorosilicone fluid commercially available under the designation FS–1265 from the Dow-Corning Co. on acid-washed diatomaceous earth. N-fluoroperfluoroisopropylidenimine is identified by its infrared and N.M.R. spectra (R. D. Dresdner, F. N. Tlumar, and J. A. Young, Am. Chem. Soc. 82, 5831 (1960)).

The process of the invention is further illustrated by application of the above-described procedures using suitable proportions to other fluorinated compounds as set forth in Table XII to give the products there indicated which are separated from the reaction mixtures and identified by comparison of infrared and N.M.R. spectra with the spectra of authentic samples.

TABLE XII

| Reactant: | Product |
|---|---|
| $F_2C=NF$ | $CF_3NF_2$ |
| $CF_3CF=NF$ | $CF_3CF_2NF_2$ |
| $CF_3CF_2CF_2CF=NF$ | $CF_3(CF_2)_3NF_2$ |
| $ClCF_2CF=NF$ | $Cl(CF_2)_2NF_2$ |
| $CF_2=NCF_3$ | $(CF_3)_2NF$ |

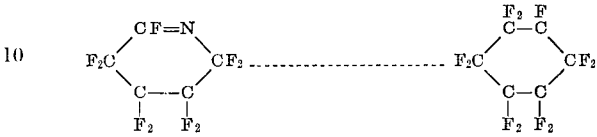

What is claimed is:

1. A process for the controlled fluorinative oxidation of fluorimines to difluoramines consisting essentially of the step of contacting a fluorimine substituted solely by substituents selected from the group consisting of fluorine, difluoramine, cyano, alkoxy, perfluoroalkyl and perfluoroalkylene with 1,1-bis(fluoroxy)perfluoralkane in the presence of catalyst.

2. A process for the production of $$CF_3ONF_2$$

which comprises reacting bis(fluoroxy)difluoromethane with tetrafluorohydrazine.

3. A process for the formation of perfluoroalkyl nitro compounds by controlled, concomitant fluorinative and oxygenative oxidation comprising contacting perfluoroalkyl cyanide with 1,1-bis(fluoroxy)perfluoroalkane.

References Cited

UNITED STATES PATENTS

| 3,410,853 | 11/1968 | Koshar | 260—248 |
| 3,420,866 | 1/1969 | Prager et al. | 260—453 |
| 3,440,251 | 4/1969 | Pilipovich | 260—350 |

OTHER REFERENCES

Hoffman, Chemical Reviews, vol. 64, pp. 91 to 98 (1964).

LELAND A. SEBASTIAN, Primary Examiner

U.S. Cl. X.R.

149—109; 260—453, 465.5, 543, 583, 584, 610, 644, 694

UNITED STATES PATENT OFFICE
CERTIFICATE OF CORRECTION

Patent No. 3,585,218            Dated June 15, 1971

Inventor(s) Richard L. Talbott

It is certified that error appears in the above-identified patent and that said Letters Patent are hereby corrected as shown below:

Col. 1, line 33, "hypfluorite" should read --hypofluorite--.
Col. 2, lines 38-39, "bis(fluoroxy(difluo-romethane" should read --bis(fluoroxy)difluo-romethane--.
Col. 4, line 23, "intsant" should read --instant--;
      line 50, "RCF(OF)$_2$" should read --(RCF(OF)$_2$)--;
      line 57, "elase" should read --else--.
Col. 7, lines 24-25, "0.$\overset{2}{\phantom{0}}$" should read --0.2--;
      lines 30-31, "45.$\overset{0}{\phantom{0}}$" should read --45.0--;
      lines 32-33, "17.$\overset{2}{\phantom{0}}$" should read --17.2--;
      line 54, "peruoflromethyl" should read --perfluoromethyl--.
Col. 8, line 54, "eflusion" should read --effusion--;

lines 57-60, "CF$_3$OO$\overset{\overset{O}{\|}}{C}$F:     Found (percent): 13.51, 13.3"

should read --CF$_3$OO$\overset{\overset{O}{\|}}{C}$F: 13.51
                         Found: 13.3--.

Col. 10, line 26, "SiF" should read --SiF$_4$--;
      line 74, "85(CF$_2$O$^+$)" should read --85(CF$_3$O$^+$)--.
Col. 13, line 29, "N.H.R." should read --n.m.r.--.
Col. 15, lines 16-18, "CF$_3\overset{\overset{O}{\|}}{C}$F$_3$" should read --CF$_3\overset{\overset{O}{\|}}{C}$F--.
Col. 16, line 53, "1951 (C$_2$R$_5$O$_2{}^+$)" should read --151(C$_2$F$_5$O$_2{}^+$)--;

Page 2
UNITED STATES PATENT OFFICE
CERTIFICATE OF CORRECTION

Patent No. 3,585,218           Dated June 15, 1971

Inventor(s) Richard L. Talbott

It is certified that error appears in the above-identified patent and that said Letters Patent are hereby corrected as shown below:

Col. 16, line 57, "fonund" should read --found--.
Col. 17, line 54, "amino(" should read --amino)--.
Col. 18, line 8, "bisfluoroxy)" should read --bis(fluoroxy)--.
Col. 20, line 16, "$P_2O_5$ (is" should read --$P_2O_5$) is--;
Col. 21, line 25, insert footnote which was omitted
    --a - not measured because of the complexity of the spectrum--;
    line 6-7, "tri-chloromethane" should read --trichlorofluoromethane--;
    line 37, "Am. Chem. Soc." should read --J. Am. Chem. Soc.--.
Col. 22, lines 8-12, the formula should read

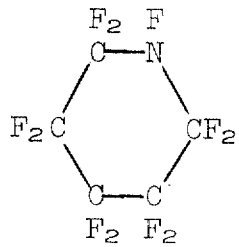

Signed and sealed this 16th day of May 1972.

(SEAL)
Attest:

EDWARD M. FLETCHER, JR.           ROBERT GOTTSCHALK
Attesting Officer           Commissioner of Patents